Oct. 6, 1959
G. W. JONES
2,907,445
CONVEYOR
Filed Oct. 31, 1950
2 Sheets-Sheet 1
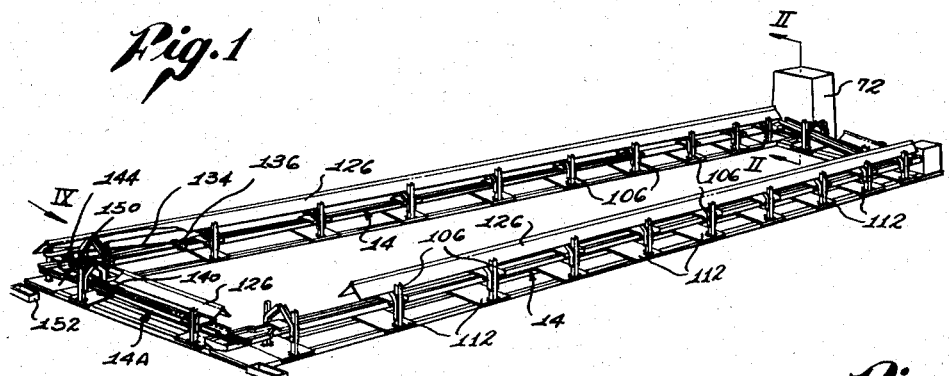
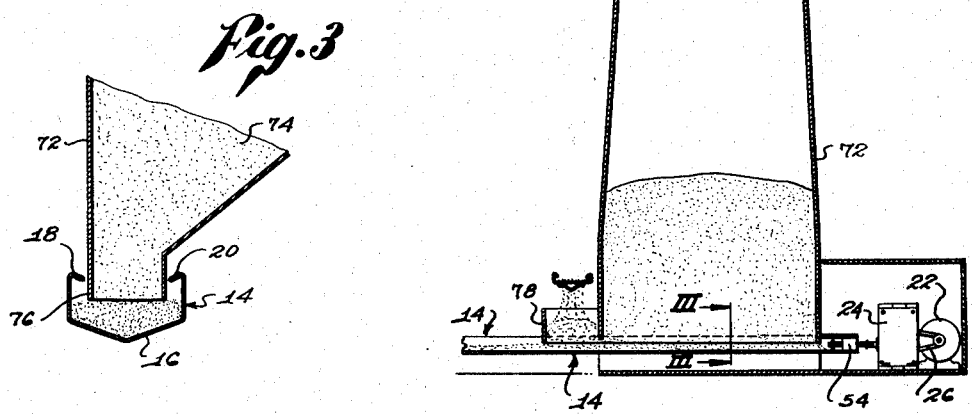
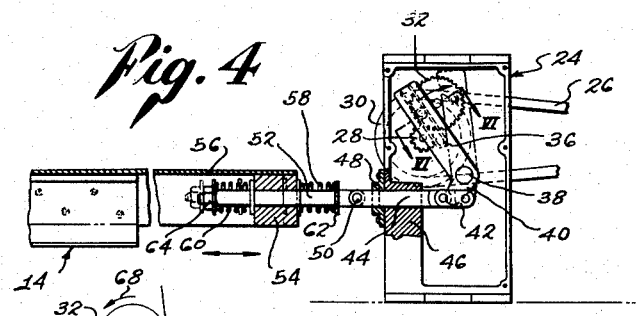
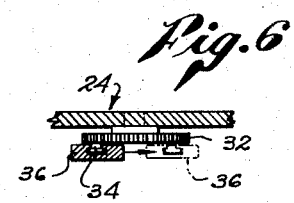
INVENTOR.
GEORGE WALKER JONES
BY
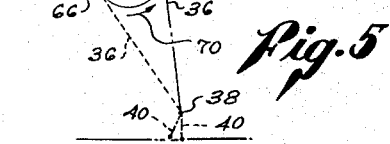
Attorney Oct. 6, 1959   G. W. JONES   2,907,445
CONVEYOR
Filed Oct. 31, 1950   2 Sheets-Sheet 2
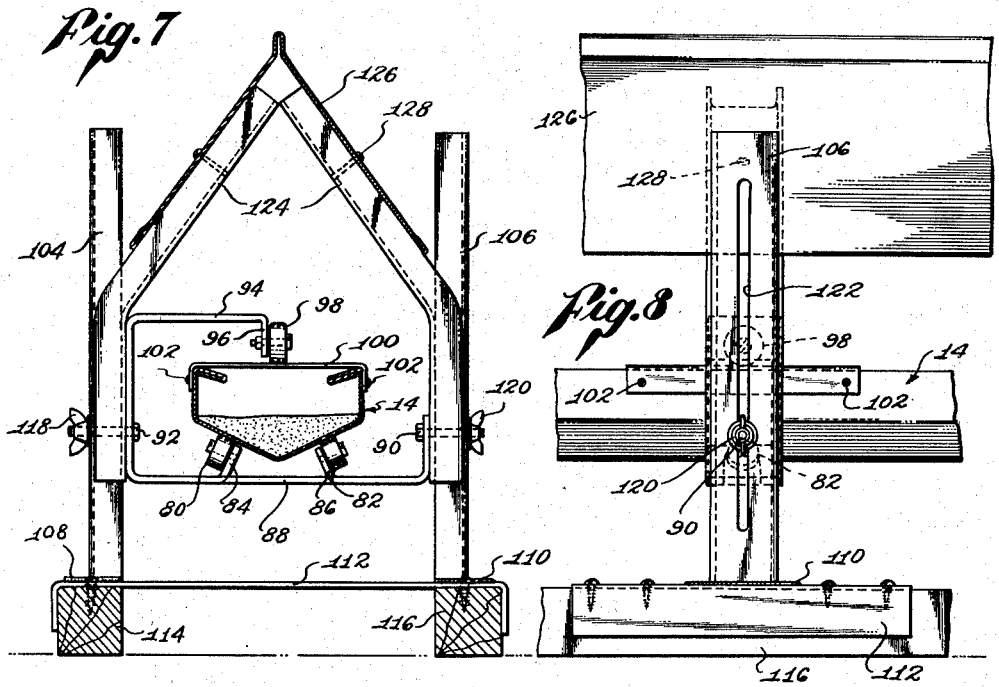
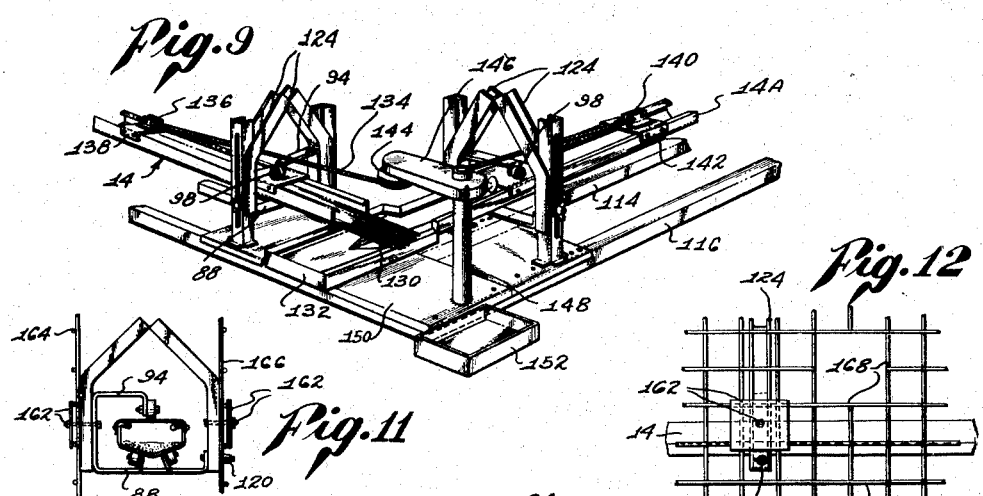
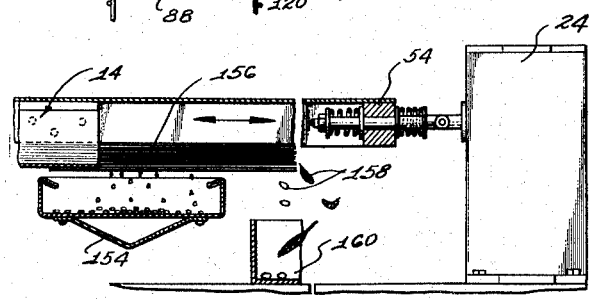
INVENTOR.
GEORGE WALKER JONES
BY Wm Edward Hann
Attorney

United States Patent Office 2,907,445
Patented Oct. 6, 1959

2,907,445

CONVEYOR

George Walker Jones, Van Nuys, Calif., assignor, by mesne assignments, to James Mfg. Co., Fort Atkinson, Wis., a corporation of Wisconsin Application October 31, 1950, Serial No. 193,111

1 Claim. (Cl. 198—85)

This invention relates to conveyors and is particularly useful for moving loose materials in a substantially horizontal direction.

The particular illustrative embodiment shows the invention applied to a poultry feeder but it is understood that the invention is equally applicable to many other uses, such as the conveying of flour in flour mills, loose grain in mills and cereal factories. In fact it is useful in any application where it is necessary to move a loose powdered granular or aggregate material, and particularly in chemical factories where it is desired to move powdered chemicals without creating a dust which would pollute the atmosphere.

Certain features of the invention as herein disclosed and applied to a poultry feeder are particularly adapted and useful in the poultry feeding business where the conveyed material is subject to being disturbed and removed from the conveyor trough by the poultry being fed but which problems would not be present where the conveyor is used for the movement of flour, powdered chemicals, grains, cereals and the like.

Referring particularly to the poultry feeding art, at the present time there is available a trough-like type of feeder in which a chain or cable is dragged along the bottom of the trough and the links of the chain or projections on the cable push or drag the feed along the trough. Obviously, in feeders of this type there must necessarily be a closed circuit for the endless chain or cable. Also the trough must be mounted with considerable precision in a straight line between the corner pulleys for the chain or cable, otherwise if the trough dips down or bows out sidewise, the chain or cable will not drag along the bottom of the trough and there will be dead places where the feed will pile up and accumulate.

Even where the chain does drag along the bottom of the trough, the feed will be pushed out to the sides and become stagnant. Furthermore, under certain moisture conditions with respect to the feed there are times when the feed will compact in the bottom of the trough and the chain will drag over it without moving it along the trough.

One of the principal shortcomings of a chain-type of poultry feeder is the high cost of maintenance. The friction of the chain dragging along the trough will wear through the bottom of the trough and thereby necessitate repairs or replacements in a comparatively short time. The chain must necessarily have considerable weight in order to drag the feed along with it, but the greater the weight of the chain the greater will be its frictional rubbing on the bottom of the trough, and consequently the quicker the trough will be worn out. The practical limit for chain feeders is about 400 feet.

Another shortcoming of the chain feed trough is that sometimes the fowls will be carried along the trough to the bars on grating customarily provided and there become entangled and injured and killed.

In the present invention as applied to the poultry feeding art, the conveyor trough is subjected to no wear other than the movement of the feed being conveyed and which, of course, imposes a very light frictional load on the surface of the trough. The result is that experimental troughs which have been in continuous use for many months show no perceptible wear whatever, due to the sliding of the feed on the surface of the trough. The polishing of the trough bottom by the feed will, of course, decrease the wear but does not affect its efficiency to move the feed.

It has also been found that the conveyor trough of the present invention need not be leveled with any particular degree of accuracy but may be mounted on ground which has considerable hill and dale contour. The feed will travel in the conveyor trough equally well regardless of whether the trough is laterally straight or crooked, or whether it is horizontally straight or mounted so as to have considerable hill and dale inclination to it. Furthermore, while the illustration herein shows a closed or return circuit for the feed, it will be readily understood that this trough may be in a single run, either straight or with lateral offsets to different feeding pens, and may run for many hundreds of feet without any return trough to the point of starting.

Another feature of the present invention as applied to poultry feeding troughs is in having a V bottom to the trough. It is the practice of some poultry feeders to clip off a portion of the upper bill of the fowl so as to prevent cannibalism. When the fowls are so debeaked it is difficult for them to pick up feed from a thin or shallow layer. With the conveyor trough having a V bottom and being given a reciprocating movement, the feed is concentrated at all times in the bottom of the V so that a relatively small amount of feed gives considerable depth for the fowl to bite into. Under such conditions, debeaked fowls have no difficulty whatever in feeding easily from the V bottom trough, and particularly inasmuch as the trough has no chain or other obstruction which would prevent or interfere with the fowl reaching into the deepest part of the feed in the trough.

Another advantage of the V bottom is that it centers the trough on two supporting rollers without the need of any side supporting rollers.

As is well known, when fowls are feeding from a trough there is a tendency to drag the feed out over the near edge of the trough. This is usually referred to as "billing." In this improved design, the trough is provided with inturned, downwardly sloping flanges at its upper edges which prevent spillage and wastage of the feed by billing. This billing is prevented by the flanges contacting the tender wattles of the fowls. It has been found that the shallow trough with the inturned flanges are more efficient in the conserving of feed than the high sided troughs now in use. This construction also uses a minimum of sheet metal, which is a distinct advantage, particularly at this time.

The flanges also serve another useful function in that when the fowl gets a mouthful of feed and raises its head to gulp, some of the feed spills out of the sides of the fowl's mouth. This spillage falls on the top sides of the downwardly sloping flanges and is thereby channeled back into the feed trough.

While gulping is overcome to a great extent where the feed trough is provided with a cover, such as in the present application, because such cover prevents the fowl from raising its head too high or backing away from the trough after getting a mouthful, there is usually some spillage. By spacing the cover a proper distance above the trough, it will permit the fowls to reach into the trough readily but when they raise their heads, the comb of the fowl will strike against the cover and keep the fowl's head in a position over the trough so that the spillage will return thereinto.

Another feature of the present invention is in having the conveyor trough mounted and guided solely on anti-friction rollers so that there will be no sliding or abrasive frictional wear on the trough to shorten its useful life. The conveyor trough is supported upon a pair of rubber-tired anti-friction rollers and is yieldingly urged into firm contact therewith at all times by a hold-down roller bearing on a bridge which spans the top of the trough. Thus the rollers are caused to roll at all times without any slippage or relative movement between the trough and the surface of the roller. The rubber also insures quiet operation, which is a desirable feature in poultry feeders.

Another feature of the present invention is having the mounting standards so arranged that the trough and its cover may be vertically adjusted as a unit so as to be at the proper height for poultry of various sizes. This is particularly useful where a long conveyor run passes through a plurality of pens of poultry with different pens having different sizes or ages of fowl therein. In those pens where the fowls are young and small, the trough is adjusted to a low position so that it may be readily eaten from by the young poultry, and then where the trough passes into the next pen it may be raised many inches higher to be in proper position for feeding substantially full grown fowls. The conveyor works equally well when one section is adjusted to its minimum height and the next adjacent section is adjusted to its maximum height, as the conveyor will move the feed material in the trough up a considerable incline without difficulty. Also, by having the supporting rollers of the standards adjustable, they may be adjusted so as to compensate for uneven mounting of the standards. The trough may thus be made to bear equally on all rollers.

A further feature of the invention is in having vertically adjustable pulley connections at the corners so that reciprocating movement of one section of the trough is imparted to another section of the trough disposed transversely thereto and in superimposed relation with respect thereto. The arrangement is such that the feed from the upper trough is discharged into the lower trough and continues off in a transverse direction. Lateral troughs may thus be branched off or fanned out in all directions.

Another feature of the present invention is in having a construction arranged so that transfer of the conveyed feed may be made from one trough to a transverse trough even though the troughs lengthen and shorten considerable distances due to thermic expansion and contraction. Under some conditions of use the temperatures range from 115° F. to 120° F. during the day but are as low as 60–70° F. during the night and where long runs of troughs are installed such, for instance, as 400, 600 or 800 feet, the lengthening and shortening of the trough due to the ambient temperatures may be as much as 6 to 10 inches in runs of 300 and 400 feet.

Heretofore, reciprocating conveyor troughs have been proposed which are suspended on a plurality of swinging pendulum-like hangers. Others have been mounted on short crank arms and given reciprocating movement which causes any one point on the conveyor to travel in a forward and upward direction. This has a tendency to throw the material forward in a series of short steps but such is not the principle utilized for movement of the material in the present invention.

In the present invention the conveyor troughs are mounted for straight line, linear, endwise, reciprocating movement and such movement is imparted to the trough by a power transmission designed so that the movement in one direction is at a rate different from the rate of movement in the opposite direction.

The amount of movement or the length of reciprocation obviously must necessarily be the same, but the rate of movement in the direction toward which the material is to be moved is at a faster rate than its return movement. This different character of movement causes the material to be moved along the trough in a very quiet manner so that powdery or dusty material is not disturbed. It makes it ideal for use such as the poultry feeder exemplified herein, and for use in chemical factories where powdered chemicals are to be moved, particularly those of an explosive character such as sulphur and the like.

An illustrative embodiment of this invention is shown in the accompanying drawings in which:

Fig. 1 is a view in perspective of the improved feeder arranged to have a crossed or returned circuit.

Fig. 2 is an enlarged sectional view taken on the line II—II of Fig. 1 looking into the direction indicated by the arrows.

Fig. 3 is a further enlarged section taken on the line III—III of Fig. 2 looking in the direction indicated by the arrows.

Fig. 4 is a view partly in elevation and partly in vertical section of the transmission for imparting reciprocating motion to the feeder trough thereof.

Fig. 5 is a diagrammatic view illustrating the motion imparted by the transmission shown in Fig. 4.

Fig. 6 is an enlarged fragmentary sectional view taken on the line VI—VI of Fig. 4.

Fig. 7 is an enlarged transverse sectional view of the feeder showing the mounting or supporting standard in elevation with the conveyer thereof and protecting cover in section.

Fig. 8 is a view in side elevation of the structure shown in Fig. 7.

Fig. 9 is a fragmentary view in perspective showing the construction and arrangement at a corner or branch where the conveyer material is passed to a transverse conveyer and showing the operating mechanism interconnecting the two conveyer runs.

Fig. 10 is a fragmentary vertical sectional view showing a conveyer thereof discharging into a transverse conveyer and at the same time sifting out foreign matter from the material being conveyed.

Fig. 11 is an elevational view showing the improved conveyer adapted to wire feeding pens; and Fig. 12 is a view in side elevation of the construction shown in Fig. 11 and showing a window opening in the wire feeding pens for permitting fowls to feed from the conveyer thereof.

In the construction shown in the drawings, a representative installation of the closed circuit or return type is shown in Fig. 1 and comprises horizontally disposed lengths of material-conducting conveyer trough 14 having a V-bottom 16 and downwardly sloping, inwardly inclined flanges 18 and 20 in the upper edges of vertical side walls forming the trough.

As shown most clearly in Figs. 2, 4, 5 and 6, means are provided for imparting a straight line reciprocatory movement to the trough 14 and comprises, in the embodiment shown, an electric motor 22 driving a transmission generally designated 24 through a V-belt 26. The transmission 24 comprises a gear 28 fixed to the shaft of a driven pulley wheel 30 for the belt 26 which meshes with and drives a gear 32.

The gear 32 is journaled on a stub shaft fixed in the side wall of the transmission case and has a headed pin 34 fixed in its outer face in eccentric relation to its axis of rotation. The headed pin 34 is slideably received in an undercut slot formed in the rocker arm 36 of a bell-crank pivoted at 38 to the housing. The bell-crank carries a short arm 40 to the outer end of which is pivoted one end of a link 42. The other end of the link 42 is pivoted to one end of a slide shaft 44 axially movable through a bearing formed by a thick wall 46 of the transmission case and an oil seal 48 secured to the outer side thereof. The other end of the slide shaft 44 is pivoted at 50 to one end of a shaft 52. The shaft 52 is axially slideable through a head block 54 which is fixed to an inverted U-shaped extension 56 which, in turn, is secured rigidly to the trough 14.

The shaft 52, at each side of the head block 54, is provided with helical compression springs 58 and 60, one end of each of which bears against a washer, which in turn bears against the head block 54. The other end of the spring 58 bears against a washer 62 which abuts against a shoulder integrally formed on the shaft 52. The other end of spring 60 bears against a washer and nut assembly 64 secured to the end of shaft 52 opposite to its pivotal connection.

As shown most clearly in Fig. 5 and diagrammatically, the point 66 represents the axis of the headed stud 34 and as the gear 32 is rotated in a direction of the arrows shown in this figure, the stud 34 moves the lever arm 36 from the position shown in broken lines to the position shown in dotted lines and then back to its original position. It is to be noted that the arc of the path of travel between the two points 66 represented by the arrow 68 is longer than the arc of the path of travel represented by the arrow 70. Inasmuch as the time is the same in each instance, it necessarily follows that the return of movement per linear unit is different when the arm 36 is rocked in one direction from that when it is rocked in the opposite direction. Thus a reciprocation is imparted to the trough which is of a different character when moving in one direction than when moved in the opposite direction.

As shown most clearly in Figs. 2 and 3, the conveyor trough 4 is supplied with material and in the illustration shown, it is poultry feed from a bin generally designated 72. The bin is of generally rectangular shape and the sides converge upwardly so as to eliminate the tendency of the feed 74 to bridge over and not pass readily down through a converging spout 76 and into the trough 14. As shown most clearly in Fig. 2, the portion of the bin which extends into the trough 14 is provided with an exterior open topped bin 78 which receives excess feed or material from the return circuit of the poultry feeder illustrated and as long as the bin 78 is supplied with a quantity of feed, there will be no additional feed passed into the trough from the main supply bin 72.

As shown most clearly in Figs. 7 and 8, the trough 14 rests upon a mounting structure including a pair of rollers 80 and 82 journaled by anti-friction bearings on upstanding lugs 84 and 86 struck out of a horizontally disposed cross bar 88. The rollers 80 and 82 are provided with rubber tires so as to cause good frictional engagement between the exterior surface on the underside of the trough and the rollers and thus insures rotation of the rollers without any slippage. Lack of slippage insures that the wear will be in the journal bearings of the rollers rather than between the surface of the roller and the surface of the trough.

The bracket 88 extends upwardly a short distance at one side and has an opening through which an attaching bolt 90 may be passed. The other end extends upwardly a greater distance and is also provided with a hole for an attaching bolt 92. The upper end of the latter portion then extends inwardly in horizontal spaced parallel relation as shown at 94 with the end turned downwardly as shown at 96 to support a holddown roller 98. The roller 98 is also provided with a rubber tire and is journaled on anti-friction bearings in the same manner as rollers 80 and 82. The trough 14 is provided with a relatively short bridge plate 100 of inverted channel shape secured thereto by metal screws 102 and against which the holddown roller 98 frictionally bears for insuring firm contact between the trough 14 and the supporting rollers 80 and 82.

The bracket 88—94 is shown in Figs. 7 and 8 as arranged for outdoor installations and is supported on laterally spaced vertical standards 104 and 106, of channel shaped cross section. The lower ends of each of the standards are provided with horizontally extending bases 108 and 110, respectively, which are rigidly mounted, as by welding, on the top side of an inverted channel shaped mounting plate 112. The plate 112 is secured to spaced parallel skids 114 and 116 which preferably are of wood but obviously need not be of such material. The fastening bolts 90 and 92 are provided with wing nuts 118 and 120, respectively, and the web portions of the channel shaped standards 104 and 106 are provided with vertical slots 122 so that by loosening the wing nuts 118 and 120 the bracket 88—94 with its trough may be vertically adjusted to compensate for unevenness of the ground over which the installation is made and also to provide appropriate heights for convenient feeding of different sized fowls.

Each supporting unit is also provided with an A-frame generally designated 124, of channel shaped cross section, the legs of which are provided with straight parallel portions at their lower ends. The flanges of the legs exteriorly embrace the flanges of the standards 104 and 106 and the web of each is drilled to receive the attaching bolts 90 and 92. The A-frame 124 supports an inverted V-shaped cover 126 which may be secured thereto by metal screws 128. The cover 126 is in spaced relation above the trough 14 a distance such that fowls in feeding from the trough will be restrained from throwing their heads backward when they get a mouthful of feed, thereby wasting the food.

As shown most clearly in Figs. 9 and 10, the runs of conveyor trough may be mounted so as to pass the material being conveyed from one conveyor to another which extends off at right angles or other transverse directions. Referring particularly to Fig. 9, the trough 14 terminates with a plurality of spaced parallel wires 130 secured to the end thereof and extending a substantial distance therebeyond which serve to separate foreign matter, such as feathers or droppings, from the trough. The spacing of the wires is such that the feed being conveyed will pass between the wires and fall by gravity into the end of the transverse conveyor thereunder. The end of the receiving conveyor is made especially wide as shown at 132 so as to be in position to receive the feed from the trough 14 regardless of lengthening and shortening of the upper trough due to ambient temperatures.

Means are provided for transmitting the reciprocating motion from the upper trough to the lower trough and comprises a cable 134 having one end anchored at 136 to a bracket 138 secured to the trough 14 and its other end secured at 140 to a similar bracket 142 fixed to the cross trough 14A. The cable 134 passes around a sheave 144 journaled to the outer end of a horizontally disposed bracket arm 146. The other end of the arm 146 is vertically adjustably mounted by thumb screws on a vertically disposed post 148 fixed to the base skids 114 and 116 by a foot plate 150. A box 152 may be provided for receiving the feathers and other foreign material separated out by the grid wires 130.

Where the transverse trough 14A is mounted with considerable inclination as at the return end of a closed circuit installation, it may be preferable to provide it with a wide flat bottom in which case a false bottom 154, as shown in Fig. 10, is secured to the underside of the flat bottom so that the assembly may be mounted on standard supporting brackets in the same manner as the trough 14. As shown particularly in Fig. 10, the feed being conveyed is passing between spaced parallel grid wires 156 and feathers and poultry droppings 158 are being separated and fall into a receiving box 160.

Under certain conditions, it is desirable to mount the feed trough conveyor between rows of poultry cages and this may be readily done as shown in Figs. 11 and 12 wherein the bracket 88—94 is secured by bolts and clip plates 162 to the side walls of wire cages 164 and 166. An appropriate sized opening may be cut in the wire cages as shown at 168 through which the fowls may pass their heads to feed from the trough 14.

Although the construction has been herein illustrated as applied to a poultry feeder, it is to be understood that the invention herein disclosed is equally applicable to many other types of installation and that a poultry feeder is only one of many uses to which the invention may be put.

It is to be further understood that numerous details of the construction shown may be altered or omitted without departing from the spirit of this invention as defined by the following claim.

I claim:

In a conveyor system for poultry feeders, a trough support, a trough system carried by said support and defining a closed circuit, said trough system including a pair of sections having end portions in vertically spaced overlapping relationship, a power device connected to one of said trough sections to reciprocate it longitudinally, a power transmitting connection between the trough sections to longitudinally reciprocate the other trough section, a supply source for poultry feed having a feed outlet positioned to supply feed to the trough section whose end overlies the other trough section, a feed metering device operatively associated with said feed outlet and responsive to the amount of feed being circulated in said closed circuit of said trough system to control the quantity of feed introduced into the system from the supply source, said trough having an imperforate bottom, and a screen-like structure extending from the end of the over-lying trough section end and terminating beyond the confines of said other trough section.

References Cited in the file of this patent

UNITED STATES PATENTS

| Number | Name | Date |
|---|---|---|
| 756,551 | Abraham | Apr. 5, 1904 |
| 1,049,111 | Logsdon et al. | Dec. 31, 1912 |
| 1,204,522 | Wall | Nov. 14, 1916 |
| 1,422,270 | Illingworth | July 11, 1922 |
| 1,522,084 | Swearingen | Jan. 6, 1925 |
| 1,576,419 | Ellman | Mar. 9, 1926 |
| 1,821,644 | Jones | Sept. 1, 1931 |
| 1,852,488 | Stewart et al. | Apr. 5, 1932 |
| 1,858,328 | Heymann et al. | May 17, 1932 |
| 2,021,639 | Robinson | Nov. 19, 1935 |
| 2,026,103 | Sloane | Dec. 31, 1935 |
| 2,027,284 | Moore | Jan. 7, 1936 |
| 2,031,369 | Holbeck | Feb. 18, 1936 |
| 2,037,407 | Cremer | Apr. 14, 1936 |
| 2,239,578 | Sloane | Apr. 22, 1941 |
| 2,325,715 | Strain | Aug. 3, 1943 |
| 2,337,174 | Bebinger | Dec. 21, 1943 |
| 2,366,980 | Overstrom | Jan. 9, 1945 |
| 2,458,077 | Jacobsen | Jan. 4, 1949 |
| 2,499,171 | Sinden | Feb. 28, 1950 |
| 2,517,865 | Gilmour, Jr. | Aug. 8, 1950 |
| 2,550,215 | Beach | Apr. 24, 1951 |
| 2,589,690 | Graetz | Mar. 18, 1952 |
| 2,635,737 | Garnett | Apr. 21, 1953 |
| 2,674,381 | Cady | Apr. 6, 1954 |

FOREIGN PATENTS

| Number | Country | Date |
|---|---|---|
| 342,717 | Germany | Oct. 21, 1921 |
| 367,737 | Great Britain | Feb. 25, 1932 |
| 587,489 | Germany | Nov. 4, 1933 |